United States Patent [19]

Schierer

[11] 4,048,553

[45] Sept. 13, 1977

[54] INTERRUPTION-FREE POWER SUPPLY

[75] Inventor: Günter Schierer, Hochstadt, Germany

[73] Assignee: Siemens Aktiengesellschaft, Munich, Germany

[21] Appl. No.: 688,985

[22] Filed: May 24, 1976

[30] Foreign Application Priority Data

June 5, 1975   Germany ............................ 2525138

[51] Int. Cl.² ........................................... H02M 1/18
[52] U.S. Cl. .................................................. 363/57
[58] Field of Search ............... 307/64, 66, 87; 321/11

[56] References Cited

U.S. PATENT DOCUMENTS 3,876,922   4/1975   Forstbaver ............................. 321/11

FOREIGN PATENT DOCUMENTS 288   7/1963   Japan ..................................... 321/14

Primary Examiner—William M. Shoop
Attorney, Agent, or Firm—Kenyon & Kenyon, Reilly, Carr & Chapin

[57] ABSTRACT

An interruption-free power supply is disclosed comprising a line-commutated, controlled rectifier whose input is adapted to be connected to a supply voltage and whose output is connected to the network to be protected via a filter means. In order to prevent overvoltages at the inverter output from disturbing the network being protected, the inverter output is connected to a controlled rectifier which is controlled by a control unit to connect the inverter output to a battery during an overvoltage condition.

6 Claims, 2 Drawing Figures

INTERRUPTION-FREE POWER SUPPLY

BACKGROUND OF THE INVENTION

1. Field of the Invention

This invention relates to an interruption-free power supply with a line-communicated, controlled rectifier, the input of which is connected to a supply network and the output of which is connected with the input of a self-commutating, controlled inverter, which supplies the network to be protected via filter means.

2. Description of the Prior Art

Interruption-free power supplies of the aforesaid type are disclosed, for example, by M. Meyer, "Self-Commutating Thyristor Converters", Siemens AG, 3. Edition, 1974, pages 228 to 235, or in Siemens-Zeitschrift vol. 47 (1973), pages 123 to 126. These interruption-free power supplies are used to protect consumers against failure of the supply network. In this connection, the above-mentioned filter means of the power supply is required to convert the square- or step-shaped a-c voltage formed by the inverter into a sinusoidal voltage, which is, in general, demanded by the network being protected. In the event of sudden load changes, for example, if the load connected to the network being protected is dumped, voltage peaks, which may exceed the tolerances of the network being protected may occur because of the energy stored in the filter means.

It is, therefore, an object of the present invention to provide an interruption-free power supply of the above type which is modified so as to reduce such overvoltages to an extent that they are within the voltage range permissible for the network being protected.

SUMMARY OF THE INVENTION

In accordance with the principles of the present invention, the above and other objectives are accomplished in an interruption free power supply of the above type by further including therein an externally commutated rectifier which is controlled by a control unit so as to couple the inverter output voltage to a battery during overvoltages. More particularly, a voltage sensor is arranged to sense the inverter output voltage and to couple the sensed voltage to the control input of the control unit as the control voltage. The voltage sensor is, preferably, followed by a limit indicator which generates a signal if the output voltage of the inverter exceeds a predetermined limit, the output of the limit indicator being connected to the control input of the control unit.

In normal operation of the power supply of the invention, the rectifier is controlled by the phase of the firing pulses of the control unit in such a manner that only a small current flows back into the battery. If the output voltage of the inverter increases to excessively high values, as determined by the limit indicator, then the phase of the firing pulses is changed immediately, and the rectifier is controlled in this operating condition in such a manner that a larger current flows back into the battery. The overvoltage is thus kept within the limits permissible for the network being protected.

In a further aspect of the invention, the previous embodiment of the invention is modified so as to include a switch which can be switched by a switching device to place the network being protected in direct connection with the supply network when the inverter of the interruption free power supply is not properly operating. The aforesaid switching device is operated by a monitoring device which monitors the inverter output voltage and by a synchronizing device which is provided to ensure synchronism of the output voltage of the inverter and the supply voltage as to frequency and phase.

In this case, the control unit controlling the rectifier connected to the battery is activated by a voltage limiter when an overvoltage condition occurs and the synchronizing device is preventing the switching device from causing the switch to provide a direct connection to the supply network, due to an out of synchronism condition. Advantageously, the overvoltage can be measured by a sensor arranged to detect the supply network voltage. A limit indicator following the sensor delivers a signal to the control input of the control unit, if the supply network voltage exceeds a predetermined value. Alternatively, the sensed supply network voltage can be combined with the sensed inverter output in an adding stage which is followed by a limit indicator. The latter, in turn, delivers a signal if the magnitude of the difference between the two voltages exceeds a predetermined value, such signal being delivered to the input of the control unit.

To determine when the inverter output and supply network voltages are out of synchronism and, thus, when a direct connection of the supply network voltage to the network being protected should be blocked, the synchronizing device is provided with frequency and phase sensors which determine when a phase and frequency difference exists between the respective phases and frequencies of the line and inverter voltages. These sensors are followed by a limit indicators which deliver signals when the magnitude of the sensed frequency and phase differences, respectfully, exceed predetermined limits. The outputs of these indicators, in turn, are connected to the control input of the control unit.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
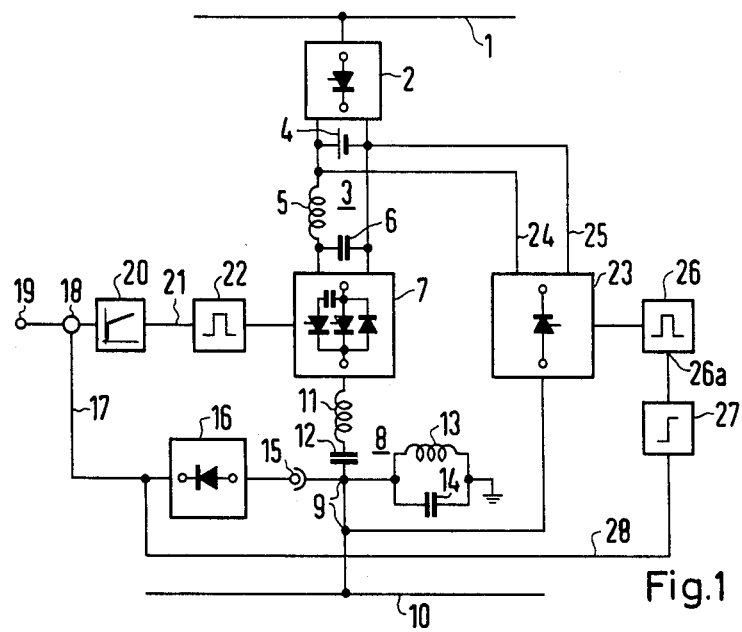
FIG. 1 shows a first embodiment of an interruption-free power supply in accordance with the principles of the present invention.

FIG. 1 shows a block diagram of a first embodiment of an interruption-free power supply in accordance with the invention. As shown, a supply network 1, which may, e.g., be a three-phase network which delivers a voltage $U_N$ having a frequency $f_N$, is connected with a line-commutated controlled rectifier 2. The output of the rectifier 2 is connected to an intermediate d-c circuit 3, which includes a battery 4, a smoothing choke 5 and a smoothing capacitor 6. The circuit 3, in turn, feeds a self-commutating controlled inverter 7, which is coupled to filter means 8. The filtered output $U_V$ of the inverter 7 appears at the junction point 9 and is at a frequency $f_V$. Such output is carried from the point 9 to a network 10 which is to be protected and which supplies a load or the consumer (not shown). The network 10 may be single-phase or a three-phase network.

As shown, the filter means 8 is in the form of a bandpass filter which includes a series resonant circuit comprising the choke 11 and the capacitor 12 and a parallel resonant circuit comprising the choke 13 and capacitor 14. The series resonant circuit is connected between the inverter output and the junction point 9, while the parallel resonant circuit is connected between the latter point and ground. These resonant circuits are tuned to the fundamental of the output voltage $U_V$, so that the latter assumes a substantially sinusoidal shape with little or no harmonic content.

A voltage transformer 15 followed by a rectifier 16 is also connected to the junction point output 9. The output of the rectifier 16 is connected via a line 17 with an adding stage 18, to which is also fed a reference voltage via a terminal 19. The output of the adding stage is coupled to a control amplifier 20, which is connected via a line 21 to a control unit 22 which controls the inverter 7. The control unit 22 may, for example, comprise a pulse generator followed by a ring counter. Such a control unit is described by D. Ernst and D. Stroele in "Industrial Electronics", Springer Verlag 1973, pages 54 and 55.

As was mentioned hereinabove, in the event of switching transients or sudden load changes, voltage peaks of the filtered inverter output can occur at the junction 9, due to the energy stored in the bandpass filter 8. In order to keep these voltage peaks or overvoltages within a permissible tolerance range, the junction 9 and, therefore, the filtered inverter output is connected to an externally commutated, controlled rectifier 23 whose output is connected via lines 24 and 25 to the terminals of the battery 4. The thyristors of the rectifier 23 are fed by a control unit 26 which generates firing pulses whose phase is controlled by a control voltage being fed to a control input 26a of the unit. The control voltage is derived from a limit indicator 27 which is connected to the output of the rectifier 16 via a line 28. Typically, the contol unit 26 may be of the type described by G. Moeltgen in "Line-Commutated Converters with Thyristors", Siemens AG 1967, page 275 or 280.

In the normal operating condition, the phase, also commonly referred to as the firing angle, of the firing pulses formed by the control unit 26 is adjusted so that only a small current or no current at all is fed from the junction point 9 to the battery 4. If overvoltages due, for example, to sudden load changes, occur at the point 9, then a signal is present at the output of the limit indicator 27, if $$U_V > U_{Vmax}$$

where $U_{Vmax}$ is an adjustable limit value at the limit indicator 27. This signal is fed to the control input 26a of the control unit 26 as the control voltage and changes the phase of the firing pulses so that a larger current is fed back from the point 9 to the battery 4. The internal resistance of the limiting circuit provided by the rectifier 23 is designed so that in the limiting case i.e., when an overvoltage is present, the inverter is loaded so that the overvoltage is limited to a value which no longer exceeds $U_{Vmax}$ and, therefore, the permissible limit voltage.

It should be noted that the voltage sensor 15 used in the arrangement of FIG. 1 is also required to be used for controlling the voltage of the inverter 7 in more conventional interruption-free power supplies. The increased cost of the arrangement of FIG. 1 over existing installations is thereby limited, since the sensor 15 is already included in such installations.

Figure 2:
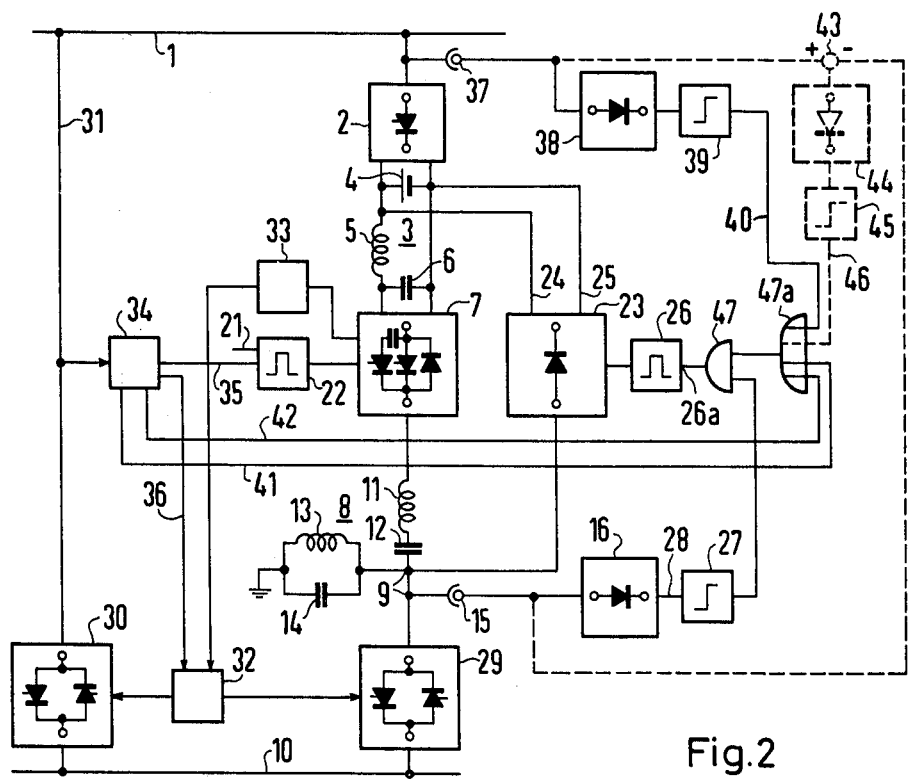
FIG. 2 shows a second embodiment of interruption-free power supply in accordance with the invention.

FIG. 2 shows a block diagram of a second interruption-free power supply in accordance with the invention. In this configuration the interruption-free power supply in its original form is adapted to be disconnected from and the supply voltage connected to the network being protected in case of a disturbance in the power supply. More particularly, as shown. the filtered output of the inverter 7 appearing at the junction 9 is connected by a switch 29 to the network 10 to be protected. The network 10 is, in addition, connected directly with the supply network 1 via a second switch 30, e.g., a thyristor switch, and a line 31. The switches 29 and 30 are switched on and off by means of a switching device 32. The switching device 32 is actuated by a monitoring device 33 associated with the inverter 7.

A synchronizing device 34 is connected with the supply network 1 via the line 31 and synchronizes the firing pulses delivered by the control unit 22 to the thyristors of the inverter 7 in such a manner that filtered output voltage $U_V$ of the inverter 7 at the junction point 9 corresponds to the network voltage $U_N$ as to its frequency and phase. To this end, measuring sensors are arranged in the synchronizing device 34 to measure the actual values of the frequency $f_N$ of the supply network voltage $U_N$ and the frequency $f_V$ of the filtered inverter voltage $U_V$ and to generate therefrom a frequency difference $\Delta f$. Likewise, the synchronizing device 34 determines the phase difference $\Delta \phi$ between the aforesaid two voltages.

It should be mentioned here that voltage control is also provided for the control unit 22, as in the embodiment of FIG. 1. Such voltage control has been only illustratively indicated by the line 21, in order to preserve the clarity of the description. In the normal operating condition, the thyristor switch 29 is closed by the switching device 32 and the thyristor switch 30 is opened. If the monitoring device 33 ascertains troubles in the operation, of the interruption-free power supply and, in particular, of the operation of the inverter 7, the switching device 32 is actuated, so that the thyristor switch 30 is switched into the circuit and the network 10 is thereby connected directly with the supply network 1. In such case, the inverter 7 may be connected parallel to the network 1 for a short time because of the filter circuits 8 present at its output. In order for the switching device 32 to be so activated, the output voltage $U_V$ and the network voltage $U_N$ must be synchronized as to frequency and phase. If this is not the case, and the synchronizing device 34 indicates the presence of an excessive frequency deviation or an excessive phase deviation, the switching device 32 is blocked via the line 36.

For situations where the switching device 32 is blocked, the interruption-free power supply of FIG. 2 is provided with means for preventing any overvoltages of the filtered inverter output from disturbing the network 10. More particularly, the junction point 9, at which point the filtered voltage appears, in connected via a rectifier 23 to a battery 4. The operation of the rectifier 23 is controlled by a control unit 26 which delivers firing pulses whose phase is adjusted so that only a small current is fed back to the battery 4 during normal operation condtions. In the event of the occurrence of an overvoltage at the junction 9 during a time when the switching device 32 is blocked, the control unit 26 is fed, via the rectifier 16 and the limiting stage 27, by a control signal which drives the rectifier 23 so that a larger current is fed to the battery 4 and the overvoltage is thereby reduced.

More particularly, the limiting stage 27 is connected via an AND gate 47 with the control input 26a of the control unit 26. The second input of the AND gate 47, in turn, is linked with an OR gate 47a which receives as inputs the outputs from the measuring sensors described below, which indicate the blocking of the network feedback circuit. One voltage sensor 37 measures the voltage $U_N$ of the supply network 1 and feeds it to a rectifier 38, which is followed by a limit indicator 39. At the output of the limit indicator 39, a signal is present if $$U_N > U_{Vmax}$$

This signal is fed via the line 40 to the OR gate 47a, and is coupled therethrough to the AND gate 47. Upon also receiving an overvoltage indication from the limit indicating device 27, the output from gate 47 causes the control unit 26 to drive the rectifier 23 so that a large amount of current is fed therethrough.

The OR gate 47a is also fed a signal from the synchronizer 34 via line 41 when the frequency difference between the voltages $U_N$ and $U_V$ is such that $$|\Delta f_N| > |\Delta f_{max}|$$

Also the OR gate 47a receives a further signal from the synchronizer device via a further line 42 if it is ascertained that the phase difference $\Delta\phi$ between the voltage $U_N$ and $U_V$ is such that $$|\Delta\phi| > |\Delta\phi_{max}|.$$

The measuring sensors and corresponding limiting stages of the synchronizing device 34 for deriving the aforesaid frequency and phase difference signals have not been shown in FIG. 2 in order to preserve the clarity of the drawing.

Instead of forming the signal from $U_N > U_{Vmax}$ by means of the rectifier 38 and the limit indicator 39, a different arrangement can be used to form an analogous signal as is shown in FIG. 2 by the arrangement shown in broken lines. In such arrangement, the outputs from the voltage sensors 15 and 37 are coupled to an adding stage 43, by means of which the difference between the network voltage $U_N$ and the output voltage $U_V$ is formed. The adding stage 43 is followed by a rectifier 44 and a limit indicator 45, the output of which is connected with the OR gate 47a. At the output of the limit indicator 45, a signal is present if $$|U_N - U_V| > \Delta U_{max}$$

In the embodiment of the interruption-free power supply of FIG. 2, the rectifier 23 is, therefore, always driven and the limiting of an overvoltage is thereby initiated, if the following criterion fulfilled:

$$U_V > U_{Vmax} \wedge [(U_N > U_{Vmax}) V(|\Delta f_1| > |\Delta f_{max}|) V V(|\Delta\phi| > |\Delta\phi_{max}|) V(|U_N - U_V| > |\Delta U_{max}|)]$$

It should be pointed out again, as it was in connection with FIG. 1, that no separate measuring sensors are required in the power supply power system of FIG. 2 for forming the above-described signals. The measuring sensor 15 for the output voltage of the inverter 7 is already needed for controlling the voltage of the inverter 7, and the voltage sensor 37 for the network voltage $U_N$ is likewise already required for the control of the rectifier 2. Also the measuring sensors of the synchronizing device 34 for ascertaining the frequency deviation and the phase difference are needed for the synchronization of the inverter 7 and are, therefore, already included in the synchronizing device. the cost for providing voltage limiting according to the invention is, therefore, kept within economically tolerable limits and does not lead to an appreciable cost increase for the installation.

What is claimed is:

1. An interruption-free power supply for connecting a supply network to a network to be protected comprising:
    a line-commutated, controlled rectifier having an input adapted to be connected to said supply network and an output which is adapted to be connected to a battery;
    a self commutating controlled inverter connected to the output of said line-commutated, controlled rectifier, said inverter including filter means adapted to be connected to said network to be protected;
    an externally commutated rectifier having a first end connected to the output of said controlled inverter and a second end adapted to be connected to said battery;
    means for sensing the output voltage of said inverter;
    and means responsive to said sensed output voltage for controlling said externally commutated rectifier so as to enable said externally commutated rectifier to carry increased current when a voltage dependent on said sensed output voltage exceeds a predetermined limit.

2. A power supply in accordance with claim 1 in which:
    said means for sensing includes a limit indicator connected to said means for controlling which generates a signal when the inverter output voltage exceeds a predetermined limit.

3. A power supply in accordance with claim 1 further including:
    a monitoring device for monitoring the output voltage of said inverter;
    synchronizing means for synchronizing said inverter output voltage with the voltage of said supply network;
    switch means responsive to said monitoring device and synchronizing means for connecting said inverter or said supply network to said network to be protected;
    and a further sensing means for sensing the voltage of said supply network, said further sensing means including limit indicating means for delivering a signal to said means for controlling when said voltage of said supply network exceeds a predetermined limit.

4. A supply network in accordance with claim 1 further comprising:
    a monitoring device for monitoring the output voltage of said inverter;
    synchronizing means for synchronizing said inverter output voltage with the voltage of said supply network;
    switch means responsive to said monitoring device and synchronizing means for connecting said inverter or said supply network to said network to be protected;

a further sensing means for sensing the voltage of said supply network;

and adding means for combining the outputs of said sensing means and further sensing means, said adding means including limit indicating means for delivering a signal to said means for controlling when the difference between the outputs of said sensing means and said further sensing means exceeds a predetermined limit.

5. A power supply in accordance with claim 3 in which:

said synchronizing means includes a frequency sensing means for determining the frequency difference between the frequencies of said inverter output voltage and said supply network voltage and indicating means for delivering a signal to said means for controlling when said frequency differences exceeds a predetermined value.

6. A power supply in accordance with claim 3 in which:

said synchronizing means includes a phase sensing means for determining the phase difference between the phases of said inverter output voltage and said supply network voltage and indicating means for delivering a signal to said means for controlling when said frequency difference exceeds a predetermined value.

* * * * *